Feb. 17, 1970   H. J. HALL ET AL   3,495,379
DISCHARGE ELECTRODE CONFIGURATION

Filed July 28, 1967   2 Sheets-Sheet 1

INVENTORS
HERBERT  J. HALL
MYRON    ROBINSON
JOSEPH   SHEPARD

BY *Stowell & Stowell*

ATTORNEYS

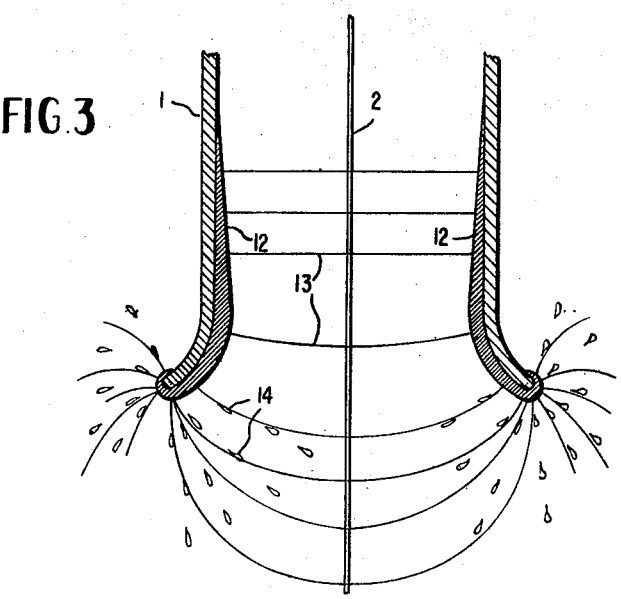
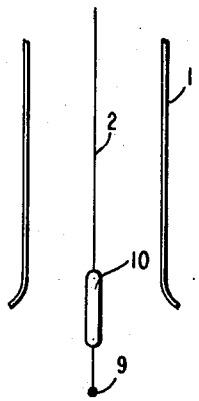
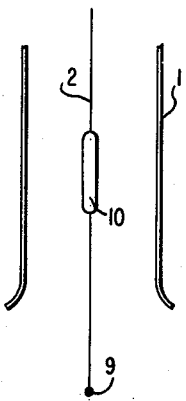
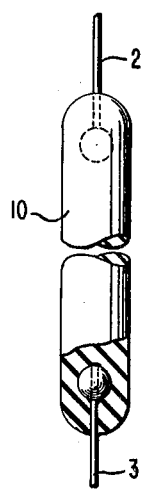
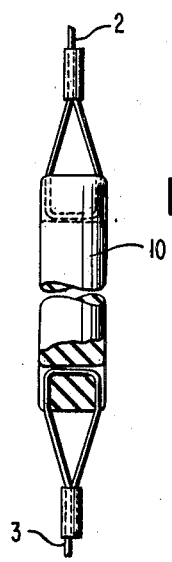
INVENTORS
HERBERT J. HALL
MYRON ROBINSON
JOSEPH SHEPARD
BY Stowell & Stowell
ATTORNEY United States Patent Office 3,495,379
Patented Feb. 17, 1970

3,495,379
DISCHARGE ELECTRODE CONFIGURATION
Herbert J. Hall, Skillman, Myron Robinson, Highland Park, and Joseph Shepard, New Providence, N.J., assignors to Research-Cottrell, Inc., Bidgewater Township, Somerset County, N.J., a corporation of New Jersey
Filed July 28, 1967, Ser. No. 656,752
Int. Cl. B03c 3/36
U.S. Cl. 55—2                                     5 Claims

ABSTRACT OF THE DISCLOSURE

A discharge electrode assembly for suppressing the reentrainment of liquid precipitate from the lower edge of the collecting electrode of an electrostatic precipitator. The discharge electrode is in two parts, with the lower part operated at a lower potential than the upper portion. This electrode design also serves to eliminate sparkover, and subsequent wire breakage therefrom, at the point at which the discharge wire passes the lower edge of the collecting electrode. By the methods and apparatus of the invention, it is then possible to maintain higher operating voltages in the active precipitation zones and thereby to improve substantially the collection efficiency of the precipitator and/or to achieve a given collection efficiency in precipitators of smaller size and of lower cost for either dry or liquid particles.

---

In an electrostatic precipitator, a solid or liquid particle that has migrated through the gas stream and attached itself to the surface of a collecting electrode is subject to various forces of adhesion and repulsion. These include van der Waal's forces, electrostatic forces due to the corona discharge and associated electric field, surface tension forces (for liquid particles), aerodynamic forces, and others. If the net repulsive force exceeds the net attractive force, the precipitated material will be removed from the collecting electrode surfaces (eroded) and resuspended in the gas (reentrained). Obviously, if an electrostatic precipitator is to achieve maximum collection efficiency, it must operate under conditions of minimum reentrainment.

A particle in contact with the collecting electrode tends to acquire, by induction, a charge of the same sign as that of the collecting electrode and therefore tends to experience a force of repulsion from that electrode. It is readily shown (H. J. Lowe and D. H. Lucas, Brit. J. Appl. Phys. Suppl. No. 2, S40–S-47 (1953)) that the electrostatic repulsive force is an increasing function of the electric field intensity. Consequently, in precipitators operated at rather high voltages, as may be the case with compressed gases which are to be cleaned, electrostatic repulsive forces may seriously contribute to increased reentrainment of collected material. Likewise, even in precipitators operating at more usual voltage levels, localized regions of inordinately high electric stress may exist on the collecting electrode at points of low radius of curvature, as for example, along the upper and lower edges of sheet metal collecting electrodes.

Although the electrostatic force of repulsion at a collecting surface may manifest itself anywhere on the surface for any precipitate, its effect on reentrainment is most likely to be conspicuous at the lower edge of the collecting electrode in the precipitation of liquid particles (droplets). Liquid particles precipitating onto the collecting electrode wet the electrode surface and run down to the electrode's lower edge. Depending on the impressed voltage and other factors, the liquid film at the edge of the collecting electrode may experience an electrostatic repulsive force so intense that the liquid will no longer drip off the edge and fall downward into a suitable receptacle (whence it is removed from the system). Instear, a rain of liquid particles results, varying in size from fine spray to heavy drops, accompanied by spattering both between the lower edge of the collecting electrode and the discharge wire(s) and outward from the edges. Liquid already precipitated out of the gas and running down the collecting walls is thus reentrained into the gas stream and the interelectrode space.

If the collecting electrode is a tube, broad flares on its lower edge will not remedy the problem at sufficiently high, although readily accessible, voltages. Laboratory tests using a 7-mil diameter corona-discharge wire in a 3-inch diameter tube containing a pressurized carbon dioxide show significant reentrainment of precipitated oil mist at 40–50 kv. and very serious reentrainment at 70 kv. Also, field tests in high pressure natural gas reveal a marked drop in precipitator collection efficiency of oil mist at about 70 kv. if precautions are not taken to eliminate electrostatic reentrainment.

By the practice of this invention, electrostatic reentraining force can be reduced or eliminated by reducing or lowering to zero the electric field obtained over the region of collecting surface in question. More specifically, the field intensity is reduced to below some critical value E dependent on the characteristics of the liquid precipitate, the geometry of the electrodes, the gas velocity and density, and other factors.

Further, the practice of this invention lowers the electric field in the interelectrode gap and reduces the likelihood of sparking between the discharge and collecting electrodes. In particular, if the potential difference and associated field between the discharge and collecting electrodes is sufficiently low at the region a discharge wire passes the lower edge of the collecting electrode, sparkover which would ordinarily be frequent at that point, will be suppressed. Since repeated sparking will in time destroy a discharge electrode, the life expectancy of these electrodes is thereby increased. Typically in electrostatic precipitators the dust or aerosol concentration is greatest near the bottom of the collecting electrodes due to point of entry into hoppers. Large amounts of collected material also appear in this region when collecting electrodes are rapped to remove accumulated deposits.

Sparkover can, of course, occur at either the upper or lower edges of the collecting electrode. This invention is concerned, however, with sparkover suppression at the lower edge since sparking in this location is a more serious problem. This is so because of heavier particle concentrations in the gas, whether by reason of input or reentrainment, and because of heavier precipitate accumulations at the lower edge due to rapping and discharge to hoppers or drain to liquid pools.

It is accordingly an object of this invention to provide a discharge electrode assembly for electrostatic precipitators whereby precipitate reentrainment is minimized.

It is another object of this invention to provide a means for lowering the electric field strength at the lower edge of a collecting electrode surface while maintaining the corona discharge and associated electric field at full strength elsewhere in the precipitator. This provides higher operating voltages and field strengths in the active zones of the precipitator which yield higher precipitation rates with minimum size and cost equipment.

It is a further object of this invention to provide a discharge electrode assembly that will inhibit liquid precipitate removal by electrical forces from a collecting electrode surface.

It is yet another object of this invention to provide means to preclude the removal, by electrical forces, of precipitated liquid from the lower edge of a collecting electrode, a region of high field concentration at which liquid precipitate, flowing down the collecting surface, tends to accumulate.

It is an additional object of this invention to minimize the electric field in the interelectrode space between discharge and collecting electrode, in a region where reentrainment from the collecting surface might occur, in order that reentrained particles not be subjected to intense accelerating fields and thereby finely atomized.

It is still another object of this invention to minimize the horizontal component of the electric field vector at the lower edge of a collecting electrode so that liquid precipitate will drip directly downward off the lower edge and not be reentrained in the gas stream.

It is a further object of this invention to so control the electric field on the surface of the collecting electrode and in the interelectrode space that precipitated materials (and particularly liquid precipitate) on the collecting surface will not be removed from the surface or reatomized or resuspended in the gas stream by electrical action.

It is another object of this invention to divide the corona discharge electrode into two electrically distinct segments by means of a separating insulator or resistor, such that the upper segment is at normal corona potential, and the lower segment, which is below or which passes by the collecting electrode edge, is at a potential minimizing the reentraining, atomizing or spark-producing electric field at the collecting electrode edge and in the nearby interelectrode space.

It is still a further object of this invention to prolong discharge electrode life by reducing or eliminating breakage due to sparking at the point the discharge electrode passes the edge of the collecting electrode.

FIGURE 3 schematically illustrates the reentrainment of liquid precipitate from the lower edge of a collecting electrode if the entire inner electrode is at the corono producing potential, as distinguished from the practice of this invention;

FIGURES 4a and 4b show two possible positions of the insulator or resistor dividing the inner wire electrode; and FIGURES 5a and 5b illustrate two possible methods of terminating electrode segments 2, 2′ or 2″ and segments 3, 3′ or 3″ at the insulators 10, 10′ or 10″.

In the following description of this invention it must be borne in mind that it is an essential requiste of the invention that the two segments of the discharge wire are at different potentials, i.e., the segments must be electrically as well as mechanically distinct. Specifically, the potential $P_c$ of the collecting electrode and the potential $P_1$ of the lower discharge electrode segment must satisfy the requirement $$|P_c - P_1| < |\text{delta } P| \qquad (1)$$

where the vertical bars indicate "absolute value" and delta P is the critical potential difference (corresponding to field E described above) that must not be exceeded. The simplest practical case is to have $P_c = P_1 = 0$, i.e., to ground both collecting electrode and wire segment so that the lower edge of the collecting electrode will be in a region of zero electric field. In practice, the difference in potential between the two electrode segments may be as small as 2 or 3 kv. Under such conditions, both reentrainment and sparking in the vicinity of the lower edge of the collecting electrode will be nil.

Figure 1:
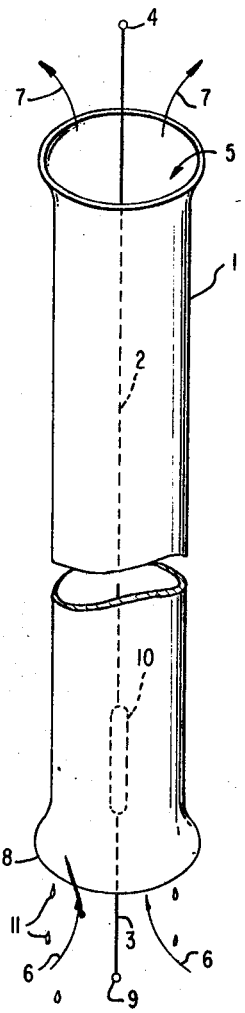
FIGURE 1 illustrates one embodiment of the invention utilizing an upper discharge wire or other small radius discharge electrode, and a lower inner electrode separated from it by an insulator or resistor, and a tubular collecting electrode.
Figure 2:
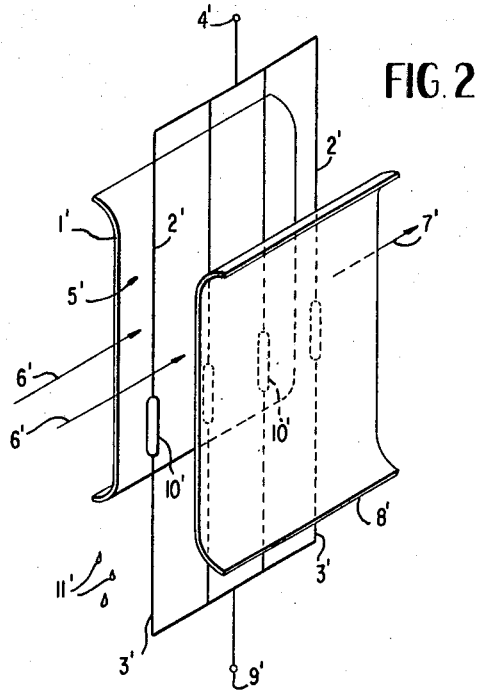
FIGURE 2 illustrates another embodiment of the invention similar to FIG. 1, except that a multiplicity of inner upper and lower electrodes are used with plate collecting electrodes.

FIGS. 1 and 2 show two embodiments of the invention, FIG. 1 illustrating a tubular collecting electrode 1 and FIG. 2 plate ("duct-type") collecting electrodes 1′. (Corresponding component parts of FIGS. 1 and 2 are designated by primed and unprimed numbers respectively.) The collecting electrodes 1 and 1′ are commonly grounded in practice. Grounding, however, is not prerequisite to the invention; it is only necessary that the collecting electrode potential be chosen in accordance with Equation 1 above. Each inner electrode is divided into two electrically distinct segments, an upper or active segment 2 or 2′, and a lower or passive segment 3 or 3′. Each upper segment 2 or 2′ is adapted to be connected to a source of electrical potential at 4 or 4′, such that the potential difference between the collecting electrodes 1 or 1′ and the upper segments 2 or 2′ is sufficient to maintain a corona discharge in the interelectrode space 5 or 5′ between the upper segment and the collecting electrode. The upper segment is the corona discharge electrode proper, and it is in this interelectrode space, normal to the upper segment, that particle charging and collection (i.e. electrostatic precipitation) takes place. Particle laden gas enters the interelectrode space in tube 1 or the interelectrode space between the plates 1′ (as indicated schematically by the arrows 6 or 6′), and is subjected to the precipitating action of the corona, and is discharged, more or less particle free, at the opposite end of the tube 1 or plates 1′ (as shown schematically by the arrows 7 or 7′). In a particular use of this invention in which oil droplets are to be collected, these droplets are removed from the gas stream and deposited on the inner surface of the collecting electrode. The liquid precipitate wets the collecting electrode and runs down its surface to the lower collecting electrode edge 8 or 8′. Now the lower segment 3 or 3′ of the inner electrode is at a potential $P_1$ (satisfying Equation 1) by virtue of its connection to potential 9 or 9′, which may be at ground, and is separated from the upper segment 2 or 2′ by an insulator or resistor 10 or 10′. The liquid precipitate flowing onto the edge 8 or 8′ is then subject to a low or zero electric field and drips directly downward off the edge (as indicated by droplets 11 and 11′) into a collection receptacle, not shown. If a single discharge electrode is used, the entire length being at the potential to which 4 or 4′ is connected, a stream of atomized liquid, as shown in FIG. 3, would spray off the edges of the electrode. In FIG. 3 the numeral 12 designates a film of liquid precipitate running down the collecting wall, 13 the lines of force of the electric field and 14 droplets which would be reentrained.

Insulator or resistor 10 or 10′ may be directly opposite the collecting electrode lower edge as shown in FIG. 4a or completely contained within the collecting electrode as in FIG. 4b. For the best protection against reentrainment, the arrangement of FIG. 4b is preferred, i.e., that the insulator or resistor 10 or 10′ be wholly contained within the tube and the lower segment of the inner electrode pass by the edge of the collecting electrode. In order to make maximum use of the length of discharge electrode, the insulator should, of course, be close to the lower end of the collecting electrode.

Figure 2A:
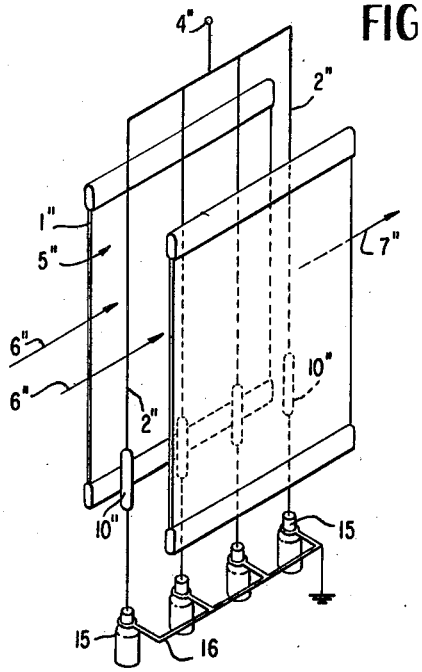
FIGURE 2a is a modification of FIG. 2 illustrating a typical manner of securing and grounding the lower segments of the discharge wires or other small radius of curvature discharge electrodes.

FIG. 2a depicts an embodiment of this invention illustrating a means of mechanically and electrically terminating the lower segments of the discharge electrodes. Numerals in the figure are identified by double primes (″), these numerals corresponding to the single primed (′) and unprimed numerals of FIGS. 1, 2, 3 and 4. The discharge electrodes (upper segment 2″, lower segment 3″) are held taut under suitable tension by metallic weights 15″ at the segments' lower ends, and centered by a metallic centering device 16″. Centering device 16″ is grounded (as shown in FIG. 2a) or else biased (not shown) in accordance with the condition of Equation 1. Since both the weights and the centering device are electrically conductive, the lower segments of the discharge electrode will be grounded or suitably biased, thereby eliminating sparking and reentrainment in the neighborhood of the lower segments.

The use of a flexible insulator (e.g. Teflon) or resistor 10 or 10' may reduce wire breakage.

In FIG. 5a, the electrode segments 2 and 3 are illustrated as connected by an insulator 10. The insulator may be molded about headed or enlarged ends of the electrodes. FIG. 5b shows a similar arrangement, with the electrode ends threaded through apertures in the insulator.

While the above description of the novel electrode configuration of this invention has treated rather exclusively of the advantages for the case of abstracting liquids from gases, the same advantages are realized in the case of the abstraction of dry substances, such as soot particles from a gas.

What is claimed is:

1. An electrode energizing configuration for an electrostatic precipitator for compressed gases including an elongated vertical discharge electrode, an extended surface and vertically disposed collecting electrode adjacent and parallel to said discharge electrode, said collector electrode having an upper and a lower terminal edge, said discharge electrode being of two vertically separated parts, connecting and maintaining means connecting said separate parts to one another and maintaining a different electrical potential in said separate parts when an electrical potential is established between said discharge and collecting electrodes with the upper part of said discharge electrode at a higher electrical potential than and of the same polarity as the lower part of the discharge electrode, the lower end of the upper discharge electrode part terminating above the lower edge of the said collecting electrode, the two parts of said discharge electrode being maintained at different electrical potentials of the same polarity to thereby preclude reentrainment of liquid or other aerosol particles into a gas stream being cleaned.

2. The electrode energizing configuration of claim 1 wherein said connecting and maintaining means comprises means between said discharge electrode parts comprising an insulator or resistor positioned axially along said discharge electrode, and wherein the uppermost portion of the lower discharge electrode part extends above the lower terminal edge of said collecting electrode.

3. The electrode energizing configuration of claim 1 wherein said connecting and maintaining means comprises means between said discharge electrode parts comprising an insulator or resistor positioned at an axial point along said discharge electrode, and wherein the uppermost portion of the lower discharge electrode part extends below the lower terminal edge of said collecting electrode.

4. A method of precluding reentrainment of liquid or other aerosol particles abstracted from a compressed moving gas in an electrostatic precipitator, said precipitator having vertically disposed and parallel discharge and collecting electrodes, the step of energizing the discharge electrode to its maximum potential difference along that part of the discharge electrode which is above the lowermost portion of said collecting electrode and energizing the remaining, lowermost part of the discharge electrode to a lower potential.

5. A method according to claim 4 wherein said lower potential is the same potential as that of the collecting electrode.

References Cited

UNITED STATES PATENTS

| | | | |
|---|---|---|---|
| 1,252,183 | 1/1918 | Schmidt et al. | 55—150 X |
| 1,329,825 | 2/1920 | Bradley | 55—148 X |
| 1,337,487 | 4/1920 | Strong | 55—129 |
| 1,913,784 | 6/1933 | Wintermute | 55—139 |
| 1,997,729 | 4/1935 | Herber | 55—148 |
| 2,008,246 | 7/1935 | Deutsch | 55—138 X |
| 2,631,685 | 3/1953 | Hardy | 55—119 |
| 2,822,058 | 2/1958 | Roos et al. | 55—139 X |
| 2,867,287 | 1/1959 | Armstrong | 55—150 X |
| 2,870,861 | 1/1959 | Valvo et al. | 55—150 X |
| 2,917,130 | 12/1959 | Powers | 55—139 X |
| 3,354,617 | 11/1967 | Hoisington et al. | 55—151 X |

FOREIGN PATENTS 846,522 8/1960 Great Britain.

FRANK W. LUTTER, Primary Examiner

DENNIS E. TALBERT, Jr., Assistant Examiner

U.S. Cl. X.R.

55—136, 146, 147, 148, 151, 157